(12) United States Patent
Sugawara et al.

(10) Patent No.: US 8,249,454 B2
(45) Date of Patent: Aug. 21, 2012

(54) OPTICAL COMMUNICATION SYSTEM AND OPTICAL LINE TERMINATING APPARATUS

(75) Inventors: Toshiki Sugawara, Kokubunji (JP); Yusuke Yajima, Fujisawa (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 705 days.

(21) Appl. No.: 12/379,107

(22) Filed: Feb. 12, 2009

(65) Prior Publication Data

US 2009/0310964 A1    Dec. 17, 2009

(30) Foreign Application Priority Data

Jun. 12, 2008   (JP) ................. 2008-153894

(51) Int. Cl.
*H04B 10/20* (2006.01)
*H04B 10/08* (2006.01)
*H04J 14/00* (2006.01)

(52) U.S. Cl. ............... 398/72; 398/34; 398/17; 398/28; 398/45

(58) Field of Classification Search ............ 398/43, 398/45, 48, 58, 66, 68–72
See application file for complete search history.

(56) References Cited

U.S. PATENT DOCUMENTS

| | | | |
|---|---|---|---|
| 6,288,806 B1 * | 9/2001 | Touma et al. | 398/5 |
| 7,039,319 B1 * | 5/2006 | Moulton et al. | 398/95 |
| 7,865,077 B2 * | 1/2011 | Mukojima | 398/1 |
| 7,869,687 B2 * | 1/2011 | Ikeda et al. | 385/147 |

(Continued)

FOREIGN PATENT DOCUMENTS

EP    874481 A2 * 10/1998

OTHER PUBLICATIONS

International Telecommunication Union, ITU-T, G.984. I, Series G: Transmission Systems and Media, Digital Systems and Networks, Digital sections and digital line system—Optical line systems for local and access networks, "Gigabit-capable Passive Optical Networks (GPON): General characteristics", Mar. 2003, pp. title-iii, 1-14.

(Continued)

*Primary Examiner* — Nathan Curs
*Assistant Examiner* — Tanya Ngo
(74) *Attorney, Agent, or Firm* — Stites & Harbison, PLLC; Juan Carlos A. Marquez, Esq.

(57) ABSTRACT

There is provided an abnormal light cut-off system in which even when a high power light is inputted from an optical fiber connected to a user side apparatus by a malicious user or an accident, a trouble rate is low, the abnormal light is cut off at high sensitivity, and security is high. In a network system in which an optical line terminating apparatus and plural optical network apparatuses are connected together via plural optical connection sections and an optical branching section, the optical branching section includes one optical line terminating apparatus side port and plural optical network apparatus side branch ports, an optical line terminating apparatus side optical fiber connects the optical line terminating apparatus and the one optical line terminating apparatus side port, an optical branching section side optical fiber connects the optical network apparatus side branch port and a light cut-off section, and an optical network apparatus side optical fiber connects the light cut-off section and the optical network apparatus. When an abnormal light is inputted from the optical network apparatus side, it is cut off by the light cut-off section.

11 Claims, 20 Drawing Sheets

U.S. PATENT DOCUMENTS

| | | | |
|---|---|---|---|
| 8,090,261 B2* | 1/2012 | Sugawara et al. | 398/67 |
| 2002/0141029 A1* | 10/2002 | Carlson et al. | 359/244 |
| 2005/0078356 A1* | 4/2005 | Kwon et al. | 359/337 |
| 2006/0093356 A1* | 5/2006 | Vereen et al. | 398/33 |
| 2007/0086076 A1* | 4/2007 | Makita et al. | 359/237 |
| 2007/0122083 A1* | 5/2007 | Todoroki | 385/50 |
| 2007/0237520 A1* | 10/2007 | DeLew et al. | 398/17 |
| 2007/0274719 A1* | 11/2007 | Ferguson et al. | 398/66 |
| 2009/0304388 A1* | 12/2009 | Umematsu et al. | 398/72 |

OTHER PUBLICATIONS

International Telecommunication Union, ITU-T, G.984.2, Series G: Transmission Systems and Media, Digital Systems and Networks, Digital sections and digital line system—Optical line systems for local and access networks, "Gigabit-capable Passive Optical Networks (GPON): Physical Media Dependent (PMD) layer specification", Mar. 2003, pp. title-iii, 1-29, with Amendment 1, Feb. 2006, pp. title-iv, 1-4.

International Telecommunication Union, ITU-T, G.984.3, Amendment 1, Series G: Transmission Systems and Media, Digital Systems and Networks, Digital sections and digital line system—Optical line systems for local and access networks, "Gigabit-capable Passive Optical Networks (GPON): Transmission convergence layer specification,", Feb. 2004, pp. title-iv, 1-107, with Amendment 1, Jul. 2005, pp. title-iv, 1-38, with Amendment 2, Mar. 2006, pp. title-iii, 1-5, with Amendment 3, Dec. 2006, pp. title-iii, 1-4.

CSMA/CD, IEEE Std. 802.13/2005, Revision of IEEE Std. 802.3, "60. Physical Medium Dependent (PMD) sublayer and medium, type 1000BASE-PX10 and 1000BASE-PX20 (long wavelength passive optical networks)," 2005, pp. 121-148.

* cited by examiner

| Legend | |
|---|---|
| 11 | Reception Logic Module |
| 12 | Reception Analog Front End |
| 13 | Optical Receiver |
| 14 | WDM |
| 21 | Modulating Light Source |
| 22 | Transmission Analog Front End |
| 23 | Transmission Logic Module |
| 51 | Light Cut-Off Sections |
| 101 | Transmission Logic Module |
| 102 | Transmission Analog Front End |
| 103 | Modulating Light Source |
| 104 | WDM |
| 105 | Optical Receiver |
| 106 | Reception Analog Front End |
| 107 | Reception Logic Module |

| Legend | |
|---|---|
| 700 | Gate Timing Order Signals |

| Legend | |
|---|---|
| 800 | Packets |

| Legend | |
|---|---|
| 205 | Electrical/Optical Converter |
| 206 | Optical Amplifier |

| Legend | |
|---|---|
| 207 | Electrical/Optical Converter |
| 208 | Optical Amplifier |

| Legend | |
|---|---|
| 201 | Optical Amplifier |
| 202 | Electrical/Optical Converter |

| Legend | |
|---|---|
| 203 | Optical Amplifier |
| 204 | Electrical/Optical Converter |

| Legend | |
|---|---|
| 52 | Tap Coupler |
| 53 | Optical Monitor Section |
| 54 | Optical Control Section |
| 55 | Optical Switch |

| Legend | |
|---|---|
| 71 | Optical Splitter |
| 72 | Optical Coupler |
| 73 | Light Reception Section |
| 74 | Detection Section |
| 75 | Control Section |

OPTICAL COMMUNICATION SYSTEM AND OPTICAL LINE TERMINATING APPARATUS

CLAIM OF PRIORITY

The present application claims priority from Japanese patent application JP 2008-153894 filed on Jun. 12, 2008, the content of which is hereby incorporated by reference into this application.

FIELD OF THE INVENTION

The present invention relates to an Optical communication system and optical line terminating apparatus, and more particularly, to an optical communication system and optical line terminating apparatus used for the Passive Optical Network (PON) in which the Time Division Multiple Access (TDMA) and the Wavelength Division Multiple Access (WDMA) are concurrently used, in a signal multiplexing technology when constituting an optical access network.

BACKGROUND OF THE INVENTION

As services have been diversified on networks, we have widely used those new services which make use of advantages of networks. A typical example of the movements is a broadcasting and communication converged service, that is, an integrated service of broadcasting, Internet, and telephone (voice communication), which is called a triple-play service. In order to realize the triple-play service, constitution of Fiber To The Home (FTTH) by the PON system is becoming the main stream in access networks. In the PON system, multiple subscribers commonly use the optical fibers installed from the central office to the optical splitters, and the equipment of the central office. This common use enables a significant reduction of the network installation cost and maintenance cost by sharing those costs among subscribers. The FTTH system using the PON technology is a media sharing type network system described above, and a bandwidth a subscriber can use is nearly the same as that of what the maximum throughput of the system is divided by the number of subscribers who share the system. Since all subscribers rarely access the system at a same time, a subscriber can substantially use a wider bandwidth due to the statistical multiplex effect. Such broadband performance of the FTTH system by the PON becomes important for practicing a comfortable triple play service. The current PON systems are as follows: GE-PON by ITU-T (ITU-T G.984.1 "Gigabit-capable Passive Optical Networks (G-PON): General characteristics", ITU-T G.984.2 "Gigabit-capable Passive Optical Networks (G-PON): Physical Media Dependent (PMD) layer specification", ITU-T G.984.3 "Gigabit-capable Passive Optical Networks (G-PON): Transmission convergence layer specification"); GE-PON (IEEE standard) (IEEE 802.3ah "CSMA/CD Access Method and Physical Layer Specifications Amendment: Media Access CONUrol Parameters, Physical Layers, and Management Parameters for Subscriber Access Networks." For example, in the G-PON system, an apparatus of the central office (OLT; Optical Line Terminal) corresponds to a maximum of 64 sets of apparatuses of subscribers (ONU; Optical Network Unit) via 2.4 Gbps high-speed optical lines.

As a mechanism to make the above sharing of the OLT possible, the collision avoidance control is provided in the system. Each optical signal (upstream signal) output from each ONU, after passing through an optical splitter, is superposed one on another, the superposed signals being output toward the OLT. In order for the OLT to be able to receive these multiple signals separately, each signal from each ONU must reach the OLT at a different timing without each signal not being superposed one on another. For this purpose, the collision avoidance control is adopted in the system and an output timing of an optical signal is controlled. The standardization organizations (ITU-T, IEEE) have now started the study of the next generation PON to be a successor of these present PON systems. To make the PON system further broader, the TDMA method used in the present POM must be improved so as to have a further higher-speed and a higher bit rate.

The wavelength multiplex transmission technology is used in the triple play service in the PON system: wavelength range of 1550 to 1560 nm is assigned to the video transmission system; for the PON system, 1490 nm band data optical signal is assigned to optical signals of from the OLT to the ONT (downstream signals), while 1300 nm band data optical signal is assigned to optical signals of from the ONT to OLT.

SUMMARY OF THE INVENTION

In an FTTH system having its bit rate of, for example, 10 Gbps, it is conceivable that transmission speed and transmission distance are significantly limited by the phenomena, such as deterioration of receive sensitivity and wavelength dispersion of an optical fiber, due to speeding up.

With respect to the deterioration of receive sensitivity, it is supposed that a noise (N) component increases due to the speeding up, and the deterioration of receive sensitivity is caused by the deterioration of S/N ratio of a receiver output signal. For example, when a signal speed is four times higher, the receive sensitivity deteriorates by ¼ (6 dB). As methods of improving this, roughly two methods are promising.

The first method is a method of increasing an optical transmission output, and the method of using an optical amplifier is considered to be promising. However, when the optical amplifier with a large output is used, there arises a serious problem that an optical surge, that is, an overshoot of an optical signal caused by the high gain optical amplifier destroys a receiver.

The second method is a method of using a high sensitivity receiver, and specifically, it is considered that a method of using an avalanche photodiode (APD) is promising. When such a high sensitivity receiver is used, a system is designed such that an overload is not given to the receiver.

With respect to the wavelength dispersion, the wavelength dispersion refers to a phenomenon in which lights having different wavelengths propagate inside an optical fiber at different speeds. Since an optical spectrum of an optical signal modulated at a high-speed contains different wavelength components, the components reach a receiver at different times while propagating an optical fiber. As a result, a waveform of an optical signal causes a distortion after passing through a fiber. In order to suppress such waveform deterioration caused by the wavelength dispersion, there is a dispersion compensation technology. In the dispersion compensation technology, an optical element, which has the wavelength dispersion characteristics opposite to that of an optical fiber used in a transmission line, is disposed in an optical transmitter, a receiver, or a relay or the like, thereby aiming to cancel the wavelength dispersion characteristics of the optical fiber and to prevent waveform deterioration from happening. As such an optical element, that is, a dispersion compensator, a device such as a dispersion compensation fiber or an optical fiber grating, which has an opposite dispersion characteristics, has been studied and attempted to be practiced. However, a dispersion compensator is very expensive to be used in the PON system, therefore it is very difficult to be adopted really. As an alternative way of not using a dispersion compensator, use of a low chirp external modulator can be considered. A chirp refers to a minute and dynamic wavelength variation happened when modulating an optical carrier emitted from a communication laser in an optical communications system. The chirp causes a group delay in accordance with a wavelength dispersion value of an optical transmission line, and causes a waveform of an optical signal pulse to be distorted, resulting in the deterioration of transmission quality. When directly modulating a laser beam for a wavelength of, for example, 1490 nm or more which is used in the PON system, it is difficult to realize 20 km of transmission distance due to the influences of the chirp and the dispersion. Thus, it is thought that a way of adopting an EA (Electro-Absorption) modulator which uses the electro-absorption effect of a semiconductor is promising in this case. The reason is as follows: since the EA uses a semiconductor material, the EA is easy to be integrated with an external modulator and a laser together, which can reduce a cost up in comparison with a modulator used an optical crystal having an electro-optical effect, such as LiNbO3. In fact, using such a modulator makes more expensive than a way of directly modulating a laser beam; however, the cost up factor is not a serious one, because, in the PON system, multiple subscribers share the equipment of the central office and the cost for the equipment is divided by the number of the subscribers.

As described before, for example, in order to ensure a large loss budget in an optical transmission system of, for example, 10 Gbps or higher, there is a method of 1) using an optical amplifier or 2) using a high sensitivity receiver. However, when a malicious user inputs a high power light to an optical fiber to which a user side apparatus is connected, an OLT receiver can be destroyed. A short pulse light is conceivable as such a high power light, and in that case, an optical surge is caused by the optical amplifier, and the problem that the receiver is destroyed becomes serious.

It is an object of the invention is to provide an optical communication system using an abnormal light cut-off system and an optical line terminating apparatus, in which even when a high power light is inputted from an optical fiber connected to a user side apparatus by a malicious user or an accident, a trouble rate is low, the abnormal light is cut off at high sensitivity, and security is high.

Besides, it is another object of the invention to provide an optical communication system in which by referring to DBA information held by an OLT, it is specified that an abnormal light is a signal sent from which ONU, and only the abnormal signal by a malicious user or an accident is cut off.

The invention is realized by, for example, an optical communication system in which an optical line terminating apparatus and plural optical network apparatuses are connected together via plural optical connection sections and an optical branching section, the optical connection sections include an optical line terminating apparatus side optical fiber, plural optical branching section side optical fibers, plural optical cut-off sections, and plural optical network apparatus side optical fibers, the optical branching section includes one optical line terminating apparatus side port, and plural optical network apparatus side branch ports, the optical line terminating apparatus side optical fiber connects the optical line terminating apparatus and the one optical line terminating apparatus side port, the optical branching section side optical fiber connects the optical network apparatus side branch port and the light cut-off section, and the optical network apparatus side optical fiber connects the light cut-off section and the optical network apparatus.

According to the first solving means of the invention, there is provided an optical communication system in which an optical line terminating apparatus and a plurality of optical network apparatuses are connected together via an optical line terminating apparatus side optical fiber connected to the optical line terminating apparatus, a plurality of optical fibers respectively connected to the plurality of optical network apparatuses, and an optical branching section to connect the optical line terminating apparatus side optical fiber and the plurality of optical fibers, wherein the optical line terminating apparatus includes a wavelength division multiplexing section, a first optical coupler, a light receiving section, a light transmitting section, a first light reception section, a first detection section, and a first control section, the optical branching section includes one optical line terminating apparatus side port, a plurality of optical network apparatus side branch ports, a plurality of light cut-off sections, an optical splitter, a second optical coupler, a second light reception section, a second detection section, and a second control section, in the optical line terminating apparatus, the first optical coupler branches a signal from the wavelength division multiplexing section to the first light reception section and the light receiving section and outputs it, the first light reception section converts the optical signal into an electrical signal and outputs it to the first detection section, and when an abnormal signal light is inputted, the first detection section uses a dynamic bandwidth assignment function to detect that the signal from which optical network apparatus is abnormal, the first control section forms, based on the detection result, light cut-off control information indicating that the signal from which optical network apparatus is to be cut off, and outputs the light cut-off control information by the transmitting section through the wavelength division multiplexing section, the optical branching section receives the light cut-off control information through the optical line terminating apparatus side optical fiber, the second optical coupler branches the signal from the optical line terminating apparatus to the optical splitter and the second light reception section and outputs it, the second light reception section converts the optical signal into an electrical signal and outputs it to the second detection section, the second detection section detects the light cut-off control information, the second control section controls the light cut-off section corresponding to the optical network apparatus side optical fiber connected to the optical network apparatus indicated by the light cut-off control information, and the light cut-off section cuts off the optical signal sent from the optical network apparatus.

According to the second solving means of the invention, there is provided a n optical line terminating apparatus in an optical communication system in which the optical line terminating apparatus and a plurality of optical network apparatuses are connected together via an optical line terminating apparatus side optical fiber connected to the optical line terminating apparatus, a plurality of optical connection sections respectively connected to the plurality of optical network apparatuses, and an optical branching section to connect the optical line terminating apparatus side optical fiber and the plurality of optical connection sections, the optical line terminating apparatus comprising a wavelength division multiplexing section, a first optical coupler, a light receiving section, a light transmitting section, a first light reception section, a first detection section, and a first control section, wherein the first optical coupler branches a signal from the wavelength division multiplexing section to the first light reception section and the light receiving section and outputs it, the first light reception section converts the optical signal into an electrical signal and outputs it to the first detection section, and when an abnormal signal light is inputted, the first detection section uses a dynamic bandwidth assignment function to detect that the signal from which optical network apparatus is abnormal, the first control section forms, based on the detection result, light cut-off control information indicating that the signal from which optical network apparatus is to be cut off, and outputs the light cut-off control information by the transmitting section through the wavelength division multiplexing section, and in the optical branching section, the optical signal from the optical network apparatus indicated by the light cut-off control information is cut off.

According to the third solving means of the invention, there is provided a n optical communication system in which an optical line terminating apparatus and a plurality of optical network apparatuses are connected together via a plurality of optical connection sections and an optical branching section, wherein the optical connection sections include an optical line terminating apparatus side optical fiber, a plurality of optical branching section side optical fibers, a plurality of light cut-off sections, and a plurality of optical network apparatus side optical fibers, the optical branching section includes one optical line terminating apparatus side port and a plurality of optical network apparatus side branch ports, the optical line terminating apparatus side optical fiber connects the optical line terminating apparatus and the one optical line terminating apparatus side port, the optical branching section side optical fiber connects the optical network apparatus side branch port and the light cut-off section, the optical network apparatus side optical fiber connects the light cut-off section and the optical network apparatus, and when an abnormal signal light is inputted from the network apparatus side to the light cut-off section, the light cut-off section cuts off the abnormal signal light.

According to the fourth solving means of the invention, there is provided a n optical communication system in which an optical line terminating apparatus and a plurality of optical network apparatuses are connected together via a plurality of optical connection sections and an optical branching section, wherein the optical connection sections include an optical line terminating apparatus side optical fiber, a plurality of optical branching section side optical fibers, a plurality of light cut-off sections, and a plurality of optical network apparatus side optical fibers, the optical branching section includes a plurality of light cut-off sections, an optical splitter, an optical coupler, a light reception section, a detection section, and a control section, the optical line terminating apparatus side optical fiber connects the optical line terminating apparatus and the optical coupler, the optical branching section side optical fiber connects the optical splitter and the light cut-off section, the optical network apparatus side optical fiber connects the light cut-off section and the optical network apparatus, the optical coupler branches signals from the plurality of optical network apparatuses to the optical line terminating apparatus side optical fiber and the light reception section and outputs them, and the light reception section converts an optical signal into an electrical signal and outputs it to the detection section, and when an abnormal signal light is inputted from the network apparatus side to the light reception section, based on information detected by the detection section, the control section controls to cut off the optical signal by one of or all of the light cut-off sections.

According to the invention, it becomes possible to provide the optical communication system using the abnormal light cut-off system and the optical line terminating apparatus, in which the transmission quality is excellent, the trouble rate is low, the abnormal light is cut off at high sensitivity, and the security is high.

Besides, according to the invention, by referring to the DBA information held by the OLT, it is specified that the abnormal light is a signal sent from which ONU, and only the abnormal signal by a malicious user or an accident can be cut off.

DETAILED DESCRIPTION OF THE PREFERRED EMBODIMENTS

Hereinafter, embodiments of the invention will be described in detail with reference to the drawings.

Figure 1:
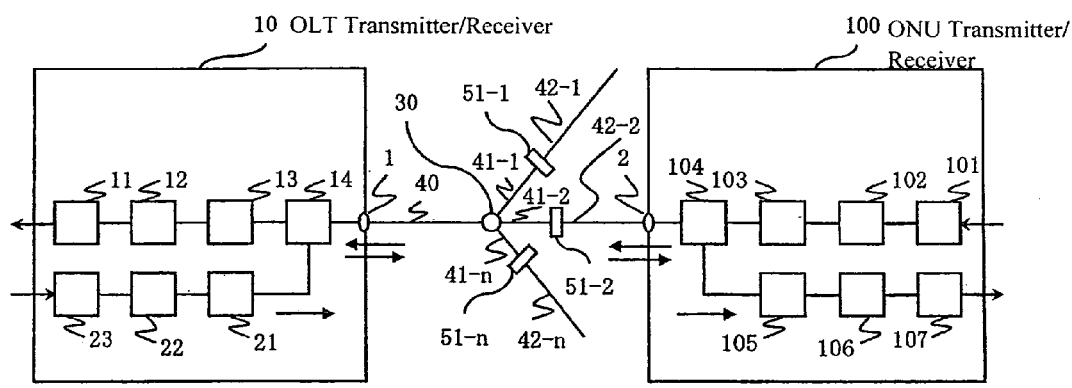
FIG. 1 is a view showing a basic structure of a PON system according to one embodiment of the invention.

FIG. 1 is a structural view of a PON system according to an embodiment.

The PON system includes an optical communication apparatus (OLT) transceiver/receiver 10 placed on the side of a central office, and one or more user side optical communication subscriber apparatus (ONU) transmitter/receiver 100, and those apparatuses are connected together via an optical line terminating apparatus side optical fiber 40, an optical branching section 30, an optical branching section side optical fiber 41, a light cut-off section 51, and an optical network apparatus side optical fiber 42. The OLT transmitter/receiver 10 and the optical line terminating apparatus side optical fiber 40 are coupled by an optical connector 1. The ONU transmitter/receiver 100 and the optical network apparatus side optical fiber 42 are coupled by an optical connector 2. The OLT transmitter/receiver 10 includes a WDM (Wavelength Division Multiplexing, wavelength division multiplexing section, wave branching unit/wave combining unit) 14, an optical receiver 13, a reception analog front end 12, a reception logic module 11, a transmission logic module 23, a transmission analog front end 22, and a light source with modulation function 21. The ONU transmitter/receiver 100 includes a WDM 104, an optical receiver 105, a reception analog front end 106, a reception logic module 107, a transmission logic module 101, a transmission analog front end 102, and a light source with modulation function 103.

Content of processing a signal will be described along with a signal flow. First, with respect to an optical signal from the OLT to the ONU (downstream signal), an electronic signal subjected to the PON frame processing by the transmission logic module 23, is amplified by the transmission analog front end 22 so as to obtain a sufficient driven power to be modulated at the light source with modulation function 21. The amplified signal is modulated by the light source with modulation function 21 and subsequently changed to an optical signal to be output. The light source with modulation function 21 can practice modulation by directly modulating a laser beam when a bit rate is up to about 2.5 Gbps. In the G-PON system or the GE-PON system, a modulated optical signal utilizes a wavelength of 1490 nm band. After passing the WDM 14, the modulated optical signal is transmitted to the optical line terminating apparatus side optical fiber 40 through the optical connector 1. When a bit rate is about 10 Gbps, the light source with modulation function 21 is practiced by combining with a laser and an external EA modulator, or by integrating them together, due to the effect of the wavelength dispersion mentioned before. A modulated optical signal used for the 10 Gbps PON is a wavelength of 1570 nm band or more (L band). After passing the WDM 14, the modulated optical signal is transmitted to the optical line terminating apparatus side optical fiber 40 through the optical connector 1. When an optical signal has a high power, the light source with modulation function 21 may be provided with an optical amplifier.

The optical signal passes the optical line terminating apparatus side optical fiber 40, the optical branching section 30, the optical branching section side optical fiber 41, the light cut-off section 51, and the optical network apparatus side optical fiber 42, and is inputted in the ONU transmitter/receiver 100. In the ONU transmitter/receiver 100, a wavelength component of, for example, 1490 nm band, or a wavelength of 1570 nm band is separated from the optical signal by the WDM 104. The optical signal is then input in the optical receiver 105. As the optical receiver 105, for example, a photodiode (PD) can be used. More specifically, a PIN type PD using a semiconductor having PIN junction or, when high sensitivity is required, an APD (avalanche photodiode) can be used. A minor change in the current output from the optical receiver 105, like PD, is converted to a change in volume, followed by being amplified and output at the reception analog front end 106. The output signal is subjected to the PON frame processing by the reception logic module 107.

Next, an optical signal from the ONU to the OLT (upstream signal) will be described. The signal subjected to the PON frame processing is inputted in the ONU transmitter/receiver 100 after processed by the reception logic module 101. The electronic signal is amplified by the transmission analog front end 102 so as to obtain a sufficient driven power to be modulated at the light source with modulation function 103. The amplified signal outputs a modulated optical signal to the light source with a modulation function 103. As one example, the light source with modulation function 103 can practice modulation by directly modulating a laser beam when a bit rate is up to about 2.5 Gbps. When a bit rate is, for example, about 10 Gbps, the light source with modulation function 21 can be practiced by combining with a laser and an external EA modulator, or by integrating them together, due to the effect of the wave length dispersion mentioned before. In the G-PON system or the GE-PON system, a modulated optical signal utilizes a wavelength of, for example, 1300 nm band. After passing the WDM 104, the modulated optical signal is transmitted to the optical network apparatus side optical fiber 42 through the optical connector 2. The optical signal sent to the optical network apparatus side optical fiber 42 is inputted in the optical branching section side optical fiber 41 through the light cut-off section 51, passes the optical branching section 30 and the optical line terminating apparatus side optical fiber 40, and then input in the OLT transmitter/receiver 10. In the OLT transmitter/receiver 10, a wavelength component of 1300 nm band is separated from the optical signal by the WDM 14. The optical signal is then input in the optical receiver 21. As the optical receiver 13, for example, a photodiode (PD) can be used. More specifically, a PIN type PD using a semiconductor having PIN junction or, when high sensitivity is required for the optical receiver 13, an APD can be used. A minor change in the current output from the optical receiver 13, like PD, is converted to a change in volume, followed by being amplified and output at the reception analog front end 12. The output signal is subjected to the PON frame processing by the reception logic module 11.

Figure 2:
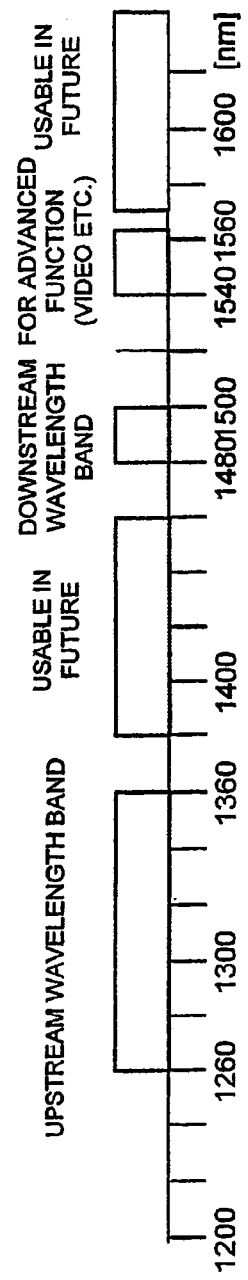
FIG. 2 is a view showing a wavelength arrangement of the PON system according to one embodiment of the invention.

FIG. 2 is a view showing a wavelength arrangement of the PON system.

An arrangement of the wavelength band used in the PON system according to this embodiment will be described with reference to FIG. 2. In the present embodiment, bidirectional signals are transmitted within a single optical fiber by using a wavelength of 1490 nm band for a downstream signal, and a wavelength of 1300 nm band for an upstream signal. In addition, an optical signal having a wavelength of 1550 nm band may also be multiplexed to the downstream signal for video distribution. Alternatively, the wavelength of 1550 nm band may be reserved for upgrade use of the system. These multiplexed optical signals are demultiplexed on the side of the central office or subscribers, therefore a subscriber can enjoy multiple services by connecting one optical fiber.

In the PON system, a downstream signal output from the OLT can be received by all ONUS, that is, the PON system has a multiple address function. Therefore, the OLT writes a downstream signal for each packet or cell in a header. The ONU receives only a signal addressed to the ONU itself. On the other hand, with respect to an upstream signal, a collision avoidance technology is adopted, which will be described with reference to FIGS. 3 and 4.

Figure 3:
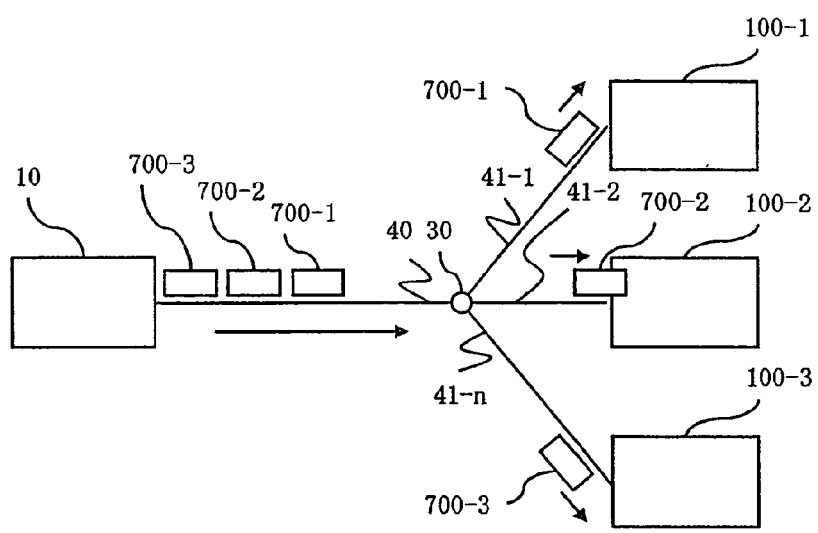
FIG. 3 is a view showing a method of an upstream signal transmission timing instruction of the PON system according to one embodiment of the invention.

FIG. 3 is a view showing a method of an upstream signal transmission timing instruction of the PON system.

Figure 4:
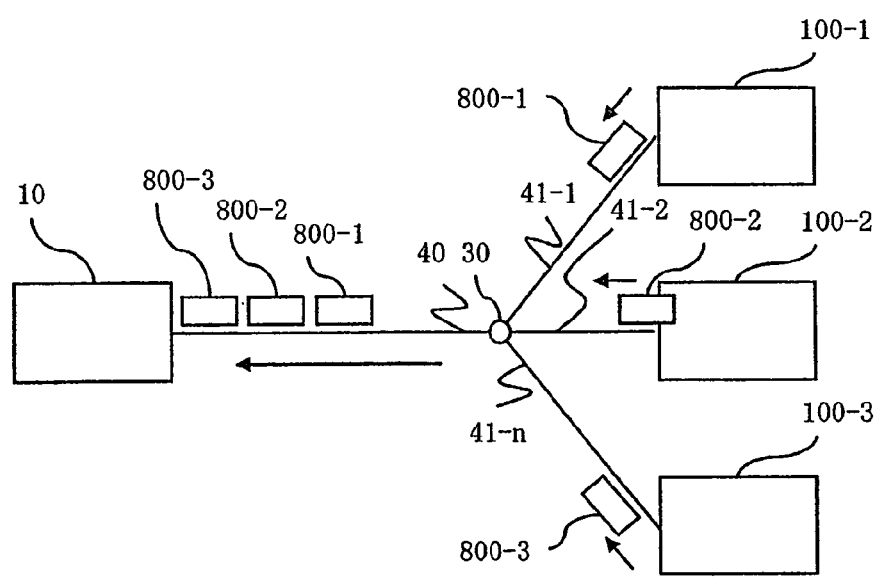
FIG. 4 is a view showing collision avoidance of upstream signals of the PON system according to one embodiment of the invention.

FIG. 4 is a view showing collision avoidance of upstream signals of the PON system.

The OLT transmitter/receiver 10 and the ONU transmitter/receiver 100 are connected via the optical line terminating apparatus side optical fiber 40, the optical branching section 30, and the optical fiber 41, as the same with FIG. 1. The optical branching section 30 outputs signals with their power being superposed one on another. Therefore, when upstream signals from the plural ONU transmitters/receivers are inputted in the optical branching section 30 at a same time, the signals are superposed one on another and output toward the OLT. If timings of the plural signals are superposed with each other, there is the case where the superposed signals cannot be separated in the OLT, therefore the signal cannot be received correctly. Consequently, each ONU is required to control its transmission timing so that respective upstream signals arrive in the OLT at different timings without superposing one on another. In the PON system, a collision of upstream signals can be avoided by the ONT communicating a permission of transmitting a signal to the ONT, thereby designating a timing of transmitting a signal. FIG. 3 illustrates that the gate timing order signals 700 designate the timing of transmitting signals to each ONU.

A cell or a packet 800 of an upstream signal output from the ONU is transmitted at a designated timing, therefore upstream signals do not collide with each other, as shown in FIG. 4.

Figure 5:
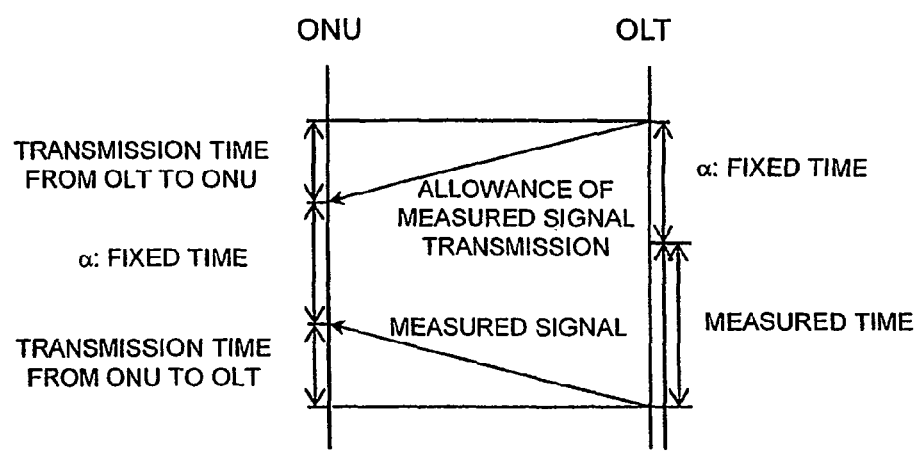
FIG. 5 is a view showing a timing chart of ranging of the PON system according to one embodiment of the invention.

FIG. 5 is a view showing a timing chart of ranging of the PON system.

Generally, in the PON system, the transmission distances between the OLT and each ONU are not identical and cannot be determined in advance. The OLT measures each transmission time between the OLT and each ONU in advance and memorizes the periods, thereby the OLT, after calculating the timings when an upstream signal from each ONU does not collide with each other, communicates the timings to each ONU. Such processing of measuring the transmission time is referred to as ranging, which is shown in FIG. 5.

First, the OLT, after transmitting an order directing the ONU that a measure signal must be transmitted after a seconds, sets a ranging window after a seconds. Next, the ONU, after receiving the direction, transmits a measure frame after a seconds. By measuring the period when the measure signal arrives, the OLT recognizes the half the period as a direction transmission time. With the ranging, the OLT admits a certain upstream signal from a certain ONU within a certain period, therefore signals from other ONUs being prohibited. The OLT transmits/receives a measure signal to/from a certain ONU within the ranging window, and calculates the transmission time between the ONU from the arrival time. A measure signal from the ONU, which has a longer transmission time than that of the ranging window, cannot be received by the OLT. Accordingly, the area of the ranging window determines a maximum distance between the OLT and the ONU in the PON system. The maximum distance is referred to as the maximum logic distance, and is prescribed differently from the physical distance determined from the transmission/receive level and the transmission line loss of an optical signal.

In the PON system, a downstream signal is transmitted as a continuous signal by connecting packets or cells, therefore the ONU receiver may not be remarkably different from a conventional optical transmission system. However, with respect to an upstream signal, since each ONU has a different clock phase and an optical intensity from each other, a signal the OLT receives is in a burst state and a dedicated burst signal receive circuit is needed in the OLT. In receiving a burst signal, the influence of a signal received immediately before must be excluded. In addition, the bit synchronization must be established with a single timing extracted from an overhead of a packet or a cell. Furthermore, the PON system is required to utilize the band efficiently on a best effort basis. With respect to a downstream signal, the OLT can detect a traffic addressed to each ONU on a network of a communication carrier; therefore the OLT can dynamically control a band by adjusting the magnitude or frequency of a packet or cell addressed to each ONU. However, in order to dynamically control a band of an upstream signal, a series of functions is needed, each ONU communicating a band that each ONU requests to the OLT, thereafter the OLT assigning the band to each ONU. The series of functions is referred to as a DBA (Dynamic Bandwidth Assignment). The DBA function not only increases the efficiency of utilization of an upstream band of the PON system, but also enables a voice signal and a video signal that are sensitive to the delay characteristics to be transmitted at a low delay.

As stated above, in the PON system, the equipment of the central office can be shared through the collision avoidance control, and plural subscribers commonly use the optical fibers installed from the central office of a subscriber accommodation station to the optical splitters and the equipment of the central office, so that the cost is shared among the subscribers, and the initial installation cost and management maintenance cost can be reduced. Here, the optical connector 2 is used in order to connect the subscriber apparatus, the ONU, and the optical network apparatus side optical fiber 42. For example, the optical connector of F04 type (SC type) is often used. Here, when a malicious user connects a high power light source of an upstream wavelength band, such as 1300 nm band, instead of the ONU apparatus, and inputs a high power light (abnormal light) to the optical network apparatus side optical fiber 42, the abnormal light passes through the WDM 14 and reaches the optical receiver 13 in the OLT receiver 10. Here, the high power light may be, for example, a short pulse in which energy is concentrated at high density in a short time. When the light with abnormally high power is incident on the optical receiver 13 including a high sensitivity receiver, an overload is applied and there is a possibility that a trouble occurs.

Then, in this embodiment, the light cut-off section 51 is provided, so that the trouble of the optical receiver 13 including the high sensitivity receiver can be prevented. Here, the light cut-off section 51 has such a feature that a light of a certain intensity or higher is inputted, the light transmittance thereof is decreased. Specifically, for example, an optical fuse, an optical shutter, an optical switch or the like is used.

Figure 10:
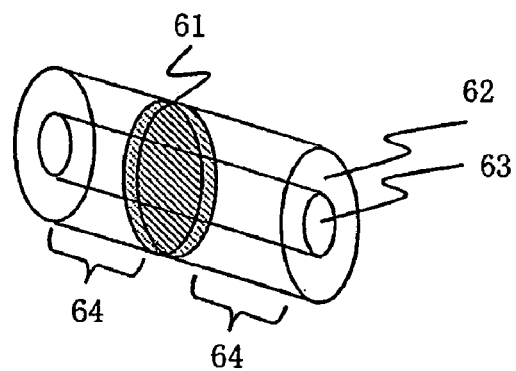
FIG. 10 is a first structural view of an optical fuse according to one embodiment of the invention.

FIG. 10 is a first structural view of an optical fuse. The optical fuse is realized by such a structure that a low melting point glass 61 is sandwiched between fibers 64. Specifically, the fiber 64 has a two-layer structure of a portion called a core 63 as a transmission path of light and a portion called a clad 62 for confining the light in the core. The refractive index of the core 63 is made higher than that of the clad 62, so that total reflection occurs at the boundary surface where the refractivity index varies, and the light does not leak to the outside of the clad 62 and can propagate through the inside of the core 63 at a low loss. Here, when light of high power is incident, the low melting point glass 61 is melted by heat generation, and the light cannot propagate.

Figure 6:
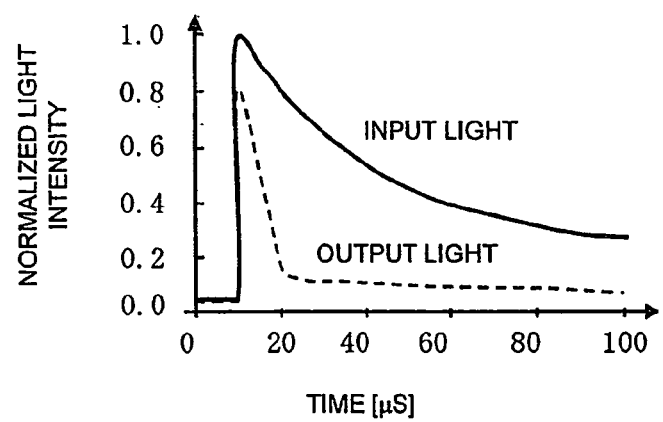
FIG. 6 is a view showing an example of a relation between an input light and an output light of an optical fuse according to one embodiment of the invention.

FIG. 6 is a view showing an example of a relation between an input light and an output light of an optical fuse.

This figure shows an example of the relation between the input light and the output light of the optical fuse, which is caused by the mechanism as stated above.

When the light of high intensity exceeding the acceptable value of the optical fuse is inputted, the low melting point glass 61 is melted in a short time, for example, in the order of micro seconds by the heat generation, and cannot propagate the light. This example shows that the low melting point glass is completely melted in 10 μs after the input of the optical pulse, and the light intensity can be suppressed. The destruction mechanism of an optical component is not completely clarified. However, it is conceivable that the optical component is damaged by (1) melting due to absorption and heat generation of an optical material, (2) brittle fracture due to heat stress, (3) insulation breakdown due to high optical electric field, and (4) destruction due to excessive current generated in the light receiving component itself by high optical field. With respect to (1) and (2), optical energy is converted into heat energy, so that the fracture occurs, and accordingly, they are phenomena influenced by the integrated value of the optical intensity. With respect to this, although a countermeasure to suppress the optical intensity is effective, a countermeasure to shorten the time of irradiation to the optical component is also effective. Besides, with respect to (3) and (4), they are destruction phenomena which occur when the optical intensity exceeds the withstanding value of the light receiving component. With respect to (4), it can be a countermeasure that the excessive current is suppressed by an electric circuit connected to a latter stage of the light receiving component. However, with respect to (3) and (4), a counter measure to suppress the optical intensity is effective. When the optical fuse of the embodiment is used, as shown in FIG. 6, both the optical intensity and the optical energy can be suppressed.

Figure 11:
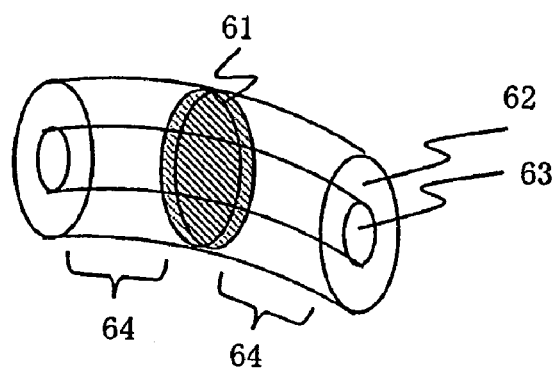
FIG. 11 is a second structural view of an optical fuse according to one embodiment of the invention.

FIG. 11 is a second structural view of an optical fuse. A fiber has such a property that when bending is applied, leakage occurs from a core to a clad, and a loss occurs. The loss of optical energy as stated above is converted into heat energy. By using this property, when bending is applied so that the heat energy is easily generated in a low melting point glass 61 of the optical fuse, it becomes possible to raise the sensitivity of the optical fuse itself and to suppress individual variations at the time of production.

Figure 14:
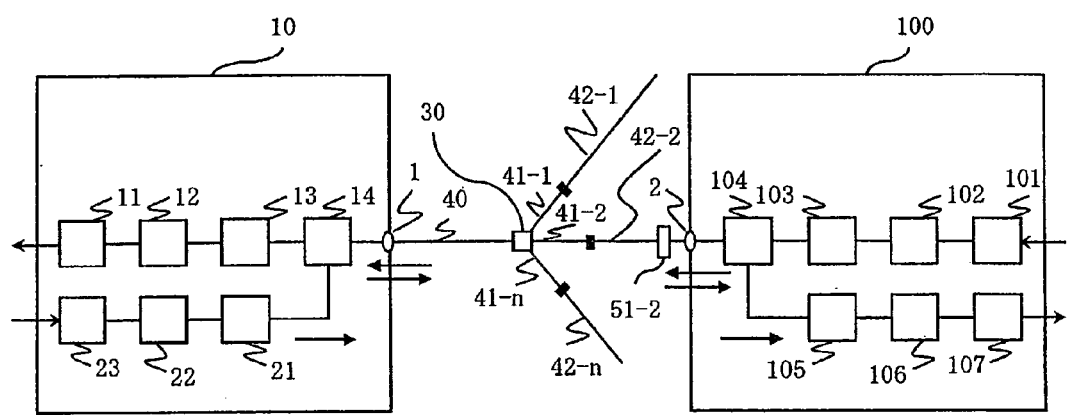
FIG. 14 is a view showing a second structure of the PON system according to one embodiment of the invention.

FIG. 14 is a view showing a second structure of a PON system.

Figure 15:
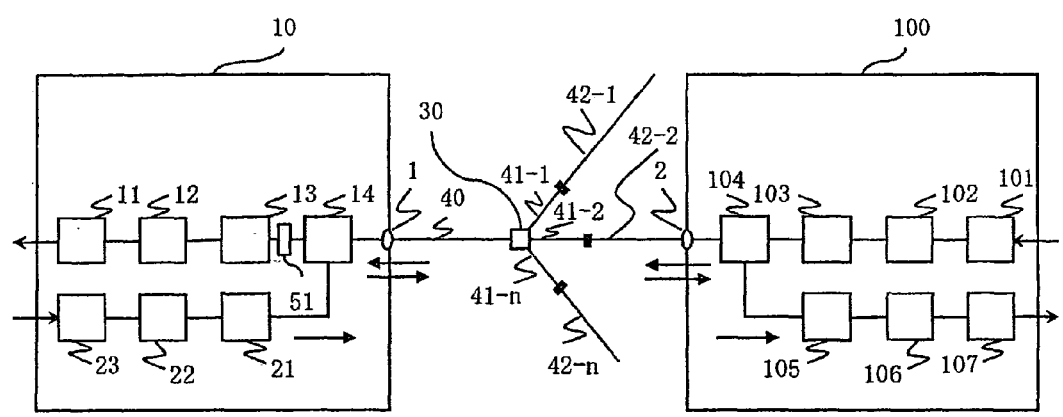
FIG. 15 is a view showing a third structure of the PON system according to one embodiment of the invention.

FIG. 15 is a view showing a third structure of a PON system.

Next, with respect to a position where the light cut-off section 51 as stated above is provided, it is preferable that at the position, the length of the optical branching section side optical fiber 41 is shorter than the length of the optical network apparatus side optical fiber 42. This is because, when the light cut-off section 51 is located at a position where the length of the optical network apparatus side optical fiber 42 is short, that is, a position close to the ONU as shown in FIG. 14, a malicious user can relatively easily handle (easily remove) the light cut-off section. Thus, there is a case where the security of the system is reduced.

Besides, as shown in FIG. 15, when the light cut-off section 51 is located in the OLT transmitter/receiver 10, or is located (not shown) on the side of the optical line terminating apparatus side optical fiber 40 between the optical branching section 30 and the OLT transmitter/receiver, the user is relatively hard to touch the light cut-off section, and the security is raised. However, when the cut-off occurs at this position, there is a case where signals to all ONUs are also interrupted. Besides, although a high power light is required to melt the low melting point glass 61 of the optical fuse, since the light attenuated by the optical branching section 30 is incident, it is conceivable that the sensitivity for causing the cut-off operation is reduced.

As shown in FIG. 14, when the light cut-off section is located at the position where the length of the optical branching section side optical fiber 41 is shorter than the length of the optical network apparatus side optical fiber 42, at the time of cut-off by the light cut-off section 51, for example, only the fiber to the malicious user can be interrupted. Besides, since the light cut-off section is located at the position where the user is relatively hard to touch, the security is raised. Further, since the light is incident before it is attenuated by the optical branching section 30, the sensitivity for causing the cut-off operation becomes high.

Further, when the optical power by which the light cut-off section 51 causes the cut-off operation is made not higher than a value obtained by adding a loss of the optical line terminating apparatus side optical fiber 40, a loss of the optical branching section 30 and a loss of the optical branching section side optical fiber 41 to the permissible optical power of the OLT transmitter/receiver 10 as the optical line terminating apparatus, the optical receiver 13 can be certainly protected.

Figure 12:
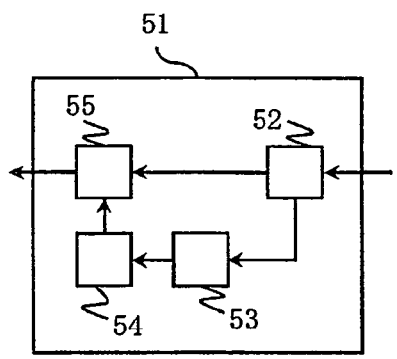
FIG. 12 is a view showing a structure of a second light cut-off section using an optical shutter according to one embodiment of the invention.

FIG. 12 is a structural view of a second structure of a light cut-off section 51.

The light cut-off section 51 includes a tap coupler 52, an optical monitor section 53, an optical control section 54, and an optical shutter 55. The optical shutter 55 is a material having an electro-optic effect, such as liquid crystal or PLZT (lead lanthanum zirconate titanate), or a component having a function to mechanically cut off light when an electrical signal is inputted. Partial power of a signal light is branched by the tap coupler 52, and the optical power is detected by the optical monitor section 53. When the detected optical power value is a certain set value or higher, the optical control section 54 drives the optical shutter 55 to cut off the light.

Figure 13:
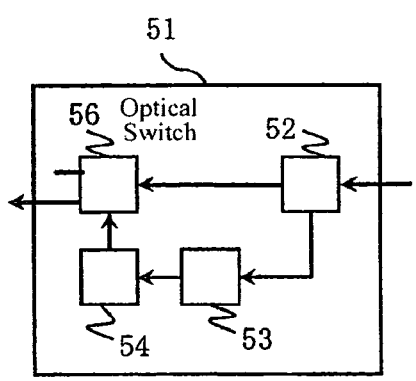
FIG. 13 is a view showing a structure of a third light cut-off section using an optical switch according to one embodiment of the invention.

FIG. 13 is a structural view of a third structure of a light cut-off section 51.

The light cut-off section 51 includes a tap coupler 52, an optical monitor section 53, an optical control section 54, and an optical switch 56. The optical switch 56 is a material having an electro-optic effect, such as liquid crystal or PLZT (lead lanthanum zirconate titanate), or a component having a function to mechanically switch a light path when an electrical signal is inputted. Partial power of a signal light is branched by the tap coupler 52, and the optical power is detected by the optical monitor section 53. When the detected optical power value is a certain set value or higher, the optical control section 54 drives the optical switch 56 to switch the light path. Here, the optical switch 56 has two paths, and the path with an arrow permits the signal light to pass, and is connected to the optical line terminating apparatus side optical fiber 40. On the other hand, the short path having no arrow is cut, and light does not emerge to the outside from the light cut-off section 51. As stated above, the optical control section 54 switches the optical switch 56 to the side having no arrow, so that the cut-off function is realized.

Figure 8A:
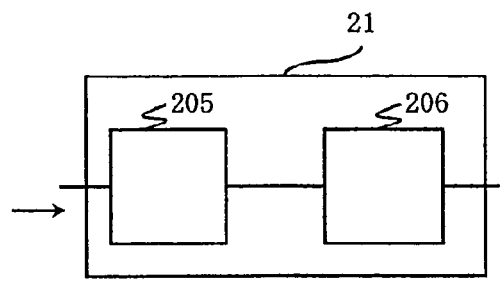
FIGS. 8A and 8B are views each showing a structure of a light source with modulation function including an optical amplifier according to one embodiment of the invention.
Figure 8B:
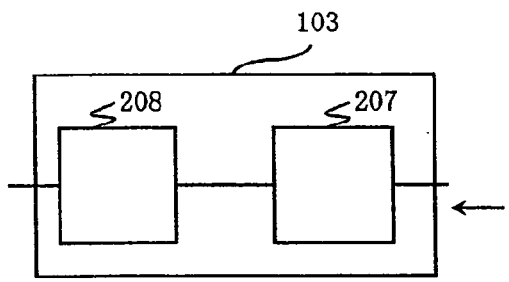

FIGS. 8A and 8B are views each showing a structure of a light source with modification function including an optical amplifier.

As another embodiment, a description will be given to a case where an optical amplifier is given to a light source with modification function 21. FIGS. 8A and 8B show this structure. In this case, the light source with modification function 21 includes an electrical/optical conversion section with modification function 205 and an optical amplifier 206 (FIG. 8A). Similarly, a light source with modification function 103 includes an electrical/optical conversion section with modification function 207 and an optical amplifier 208 (FIG. 8B). The electrical/optical conversion sections with modification function 205, 207 are for converting an electrical signal outputted from the transmission analog front end 22 or 102 into an optical signal, and the outputted optical signal is amplified by the optical amplifier 206, 208, and is outputted.

Figure 9A:
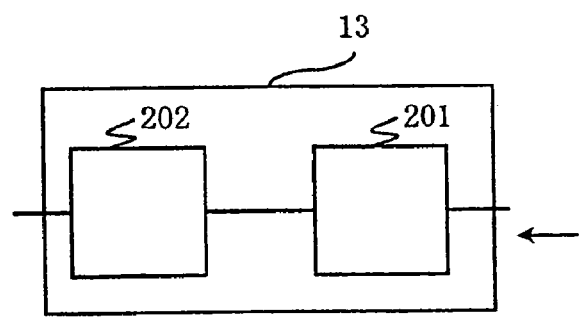
FIGS. 9A and 9B are views showing a structure of an optical receiver including an optical amplifier according to one embodiment of the invention.
Figure 9B:
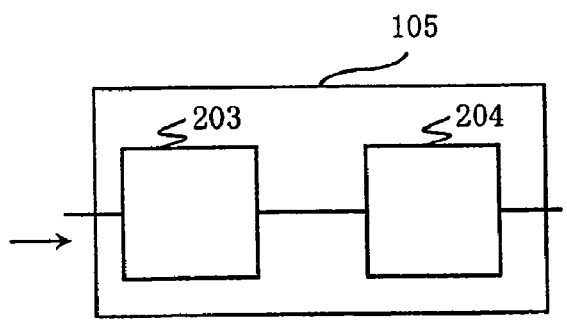

FIGS. 9A and 9B are views each showing a structure of an optical receiver including an optical amplifier.

FIG. 9A shows a structure of a case where an optical amplifier is placed at the front of an optical receiver 13. In this case, the optical receiver 13 includes an optical amplifier 201 and an optical/electrical conversion section 202 (FIG. 9A). Similarly, an optical receiver 105 includes an optical amplifier 203 and an optical/electrical conversion section 204 (FIG. 9B). A received optical signal is amplified by the optical amplifier 201, 203, and the output is converted into an electric output signal by the optical/electrical conversion section 202, 204, and is inputted to the reception analog front end 12 or 106. Then, the foregoing processing is performed.

Figure 7:
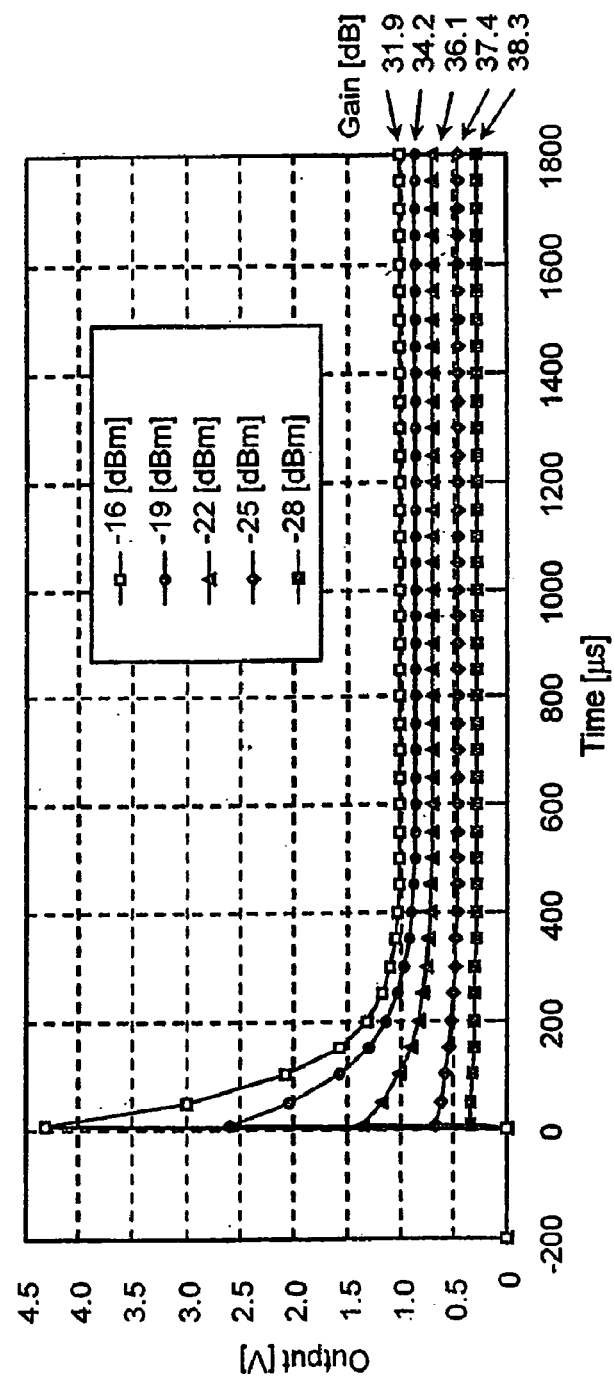
FIG. 7 is a view showing a phenomenon of an optical surge by an optical amplifier according to one embodiment of the invention.

FIG. 7 is a view showing an optical surge phenomenon caused by an optical amplifier.

Herein, an optical surge will be described. An optical surge is a phenomenon in that an optical signal causes an overshoot by a high gain optical amplifier. Due to this phenomenon, there is a possibility that an optical receiver is destroyed. FIG. 7 shows one example of the property of transient response of an optical amplifier measured by the inventor. In this case, the property of transient response was measured with a sampling oscilloscope when an optical signal input in an optical amplifier was switched (off→on) at a high speed. Herein, as an optical amplifier, an L-band Erbium-Doped Fiber Amplifier with bi-directional pumping was used. It can be understood that, as the input signal power increases by 3 dB each time from −28 dBm, the overshoot becomes greater in its height. That is, in the system using the optical amplifier, when switching off→on is performed at high speed, that is, a pulse-like light is given, the overshoot becomes liable to occur, and there is a fear that the receiver becomes liable to be damaged. By this embodiment, the abnormal light is cut off, and the countermeasure against the optical surge can be taken, and the optical communication system to protect the receiver can be realized.

Figure 16:
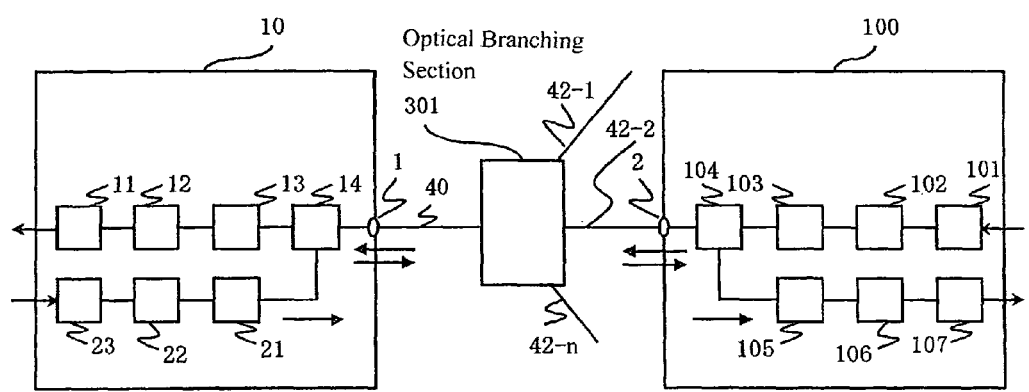
FIG. 16 is a view showing a fourth structure of the PON system according to one embodiment of the invention.

FIG. 16 is a view showing a fourth structure of a PON system.

As still another embodiment, FIG. 16 shows a structure in which an optical branching section 301 is provided with a detection section and a control section, and controls a light cut-off section 51.

This PON system includes an OLT transmitter/receiver 10 in a central office, and one or more ONU transmitters/receivers 100, and those apparatuses are connected together via an optical line terminating apparatus side optical fiber 40, the optical branching section 301, and an optical network apparatus side optical fiber 42. The OLT transmitter/receiver 10 and the optical line terminating apparatus side optical fiber 40 are coupled by an optical connector 1. The ONU transmitter/receiver 100 and the optical network apparatus side optical fiber 42 are coupled by an optical connector 2. The OLT transmitter/receiver 10 includes a WDM 14, an optical receiver 13, a reception analog front end 12, a reception logic module 11, a transmission logic module 23, a transmission analog front end 22, and a light source with modification function 21. The ONU transmitter/receiver 100 includes a WDM 104, an optical receiver 105, a reception analog front end 106, a reception logic module 107, a transmission logic module 101, a transmission analog front end 102, and a light source with modification function 103. The processing of an upstream signal and a downstream signal is as described in FIG. 1.

Figure 17:
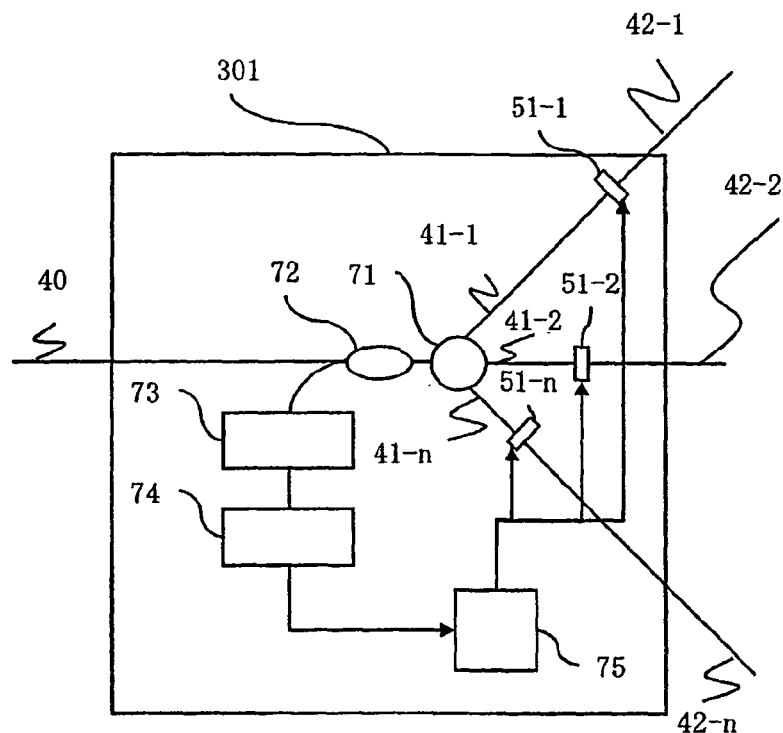
FIG. 17 is a view showing an optical branching section in the fourth structure of the PON system according to one embodiment of the invention.

FIG. 17 is a structural view of the details of the optical branching section 301.

The optical branching section 301 includes an optical branching section side optical fiber 41, a light cut-off section 51, an optical splitter 71, an optical coupler 72, a light reception section 73, a detection section 74, and a control section 75. As described in FIG. 1 and its explanation, a signal transmitted from the ONU transmitter/receiver 100 through the optical connector 2 to the optical network apparatus side optical fiber 42 is inputted to the optical branching section 301. The optical signal transmitted to the optical network apparatus side optical fiber 42 is inputted through the light cut-off section 51 to the optical branching section side optical fiber 41. The optical power is branched into two by the optical coupler 72 through the optical splitter 71. Here, the optical power branch ratio of the optical coupler 72 is, for example, 95:5, and most of the optical power, as the main signal, passes through the optical line terminating apparatus side optical fiber 40 and is inputted to the OLT transmitter/receiver 10. Part of the remaining optical power is inputted to the light reception section 73. The light reception section 73 converts the optical signal into the electrical signal, and inputs it to the detection section 74. In an example of a relatively simple control, the detection section 74 detects the optical power, and when the optical power of a certain set value or higher is detected, the control section 75 controls the light cut-off section 51 to cut off the optical signal. Incidentally, when cut-off is performed, one or more light cut-off sections 51 may be cut, or all the light cut-off sections 51 may be cut. Here, the light cut-off section 51 can be constructed of an optical shutter or an optical switch. In a relatively high-level control, the detection section 74 is made to have a function of frame processing and the like equivalent to the OLT reception logic module 11. By adopting such a structure, not only the optical power information but also the monitor control information of a PON frame can be handled, and the higher-level control can be performed. For example, even when a malicious user performs unauthorized access by using a false signal, the detection section 74 analyzes the false signal, and when it is determined that unauthorized access is performed, the control section 75 can control the light cut-off section 51 to cut off the optical signal. Specifically, for example, the processing is performed in following steps. As step 1, when the detection section 74 detects an abnormal light, reference is made to DBA information, and a process of determining that the signal is sent from which ONU is performed. Next, at step 2, the control section 75 determines that which light cut-off section 51 cuts off the signal and performs the control. In this way, an optical communication system using an abnormal light cut-off system can be configured in which transmission quality is excellent, trouble rate is low, abnormal light is cut off at high sensitivity, and security is high.

Figure 18:
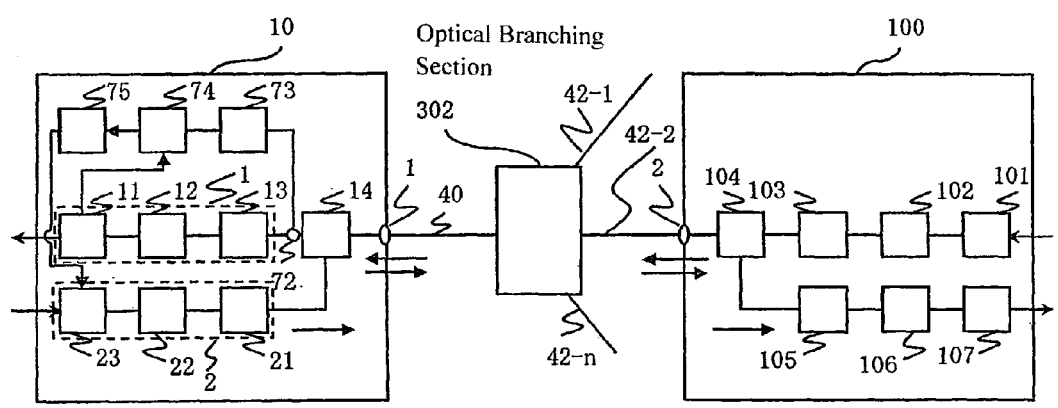
FIG. 18 is a view showing a fifth structure of the PON system according to one embodiment of the invention.

FIG. 18 is a view showing a fifth structure of a PON system.

As still another embodiment, FIG. 18 is a view showing a structure in which each of an OLT transmitter/receiver 10 and an optical branching section 302 is provided with a detection section and a control section, and a light cut-off section 51 is controlled.

The PON system includes an OLT transmitter/receiver 10 in a central office, and one or more ONU transmitters/receivers 100, and those apparatuses are connected together via an optical line terminating apparatus side optical fiber 40, the optical branching section 302, and an optical network apparatus side optical fiber 42. The OLT transmitter/receiver 10 and the optical line terminating apparatus side optical fiber 40 are coupled by an optical connector 1. The ONU transmitter/receiver 100 and the optical network apparatus side optical fiber 42 are coupled by an optical connector 2. The optical communication apparatus transmitter/receiver 10 includes a WDM 14, an optical receiver 13, a reception analog front end 12, a reception logic module 11, a transmission logic module 23, a transmission analog front end 22, a light source with modification function 21, an optical coupler 72, a light reception section 73, a detection section 74, and a control section 75. Incidentally, a light receiving section 1 includes the reception logic module 11, the reception analog front end 12, and the optical receiver 13. A light transmitting section 2 includes the light source with modification function 21, the transmission analog front end 22, and the transmission logic module 23.

Figure 19:
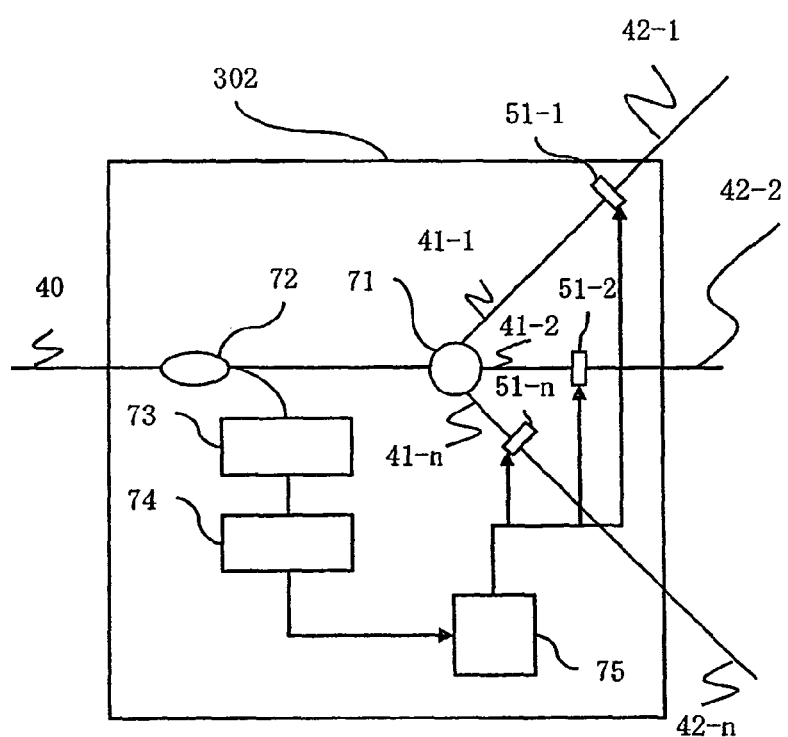
FIG. 19 is a view showing an optical branching section in the fifth structure of the PON system according to one embodiment of the invention.

FIG. 19 is a structural view of the details of the optical branching section 302.

The optical branching section 302 includes an optical branching section side optical fiber 41, a light cut-off section 51, an optical splitter 71, an optical coupler 72, a light reception section 73, a detection section 74, and a control section 75. As described in FIG. 1, a signal transmitted from the ONU transmitter/receiver 100 to the optical network apparatus side optical fiber 42 through the optical connector 2 is inputted to the optical branching section 302. The optical signal transmitted to the optical network apparatus side optical fiber 42 is inputted to the optical branching section side optical fiber 41 through the light cut-off section 51, passes through the optical line terminating apparatus side optical fiber 40 via the optical splitter 71 and the optical coupler 72, and is inputted to the OLT transmitter/receiver 10.

Figure 20:
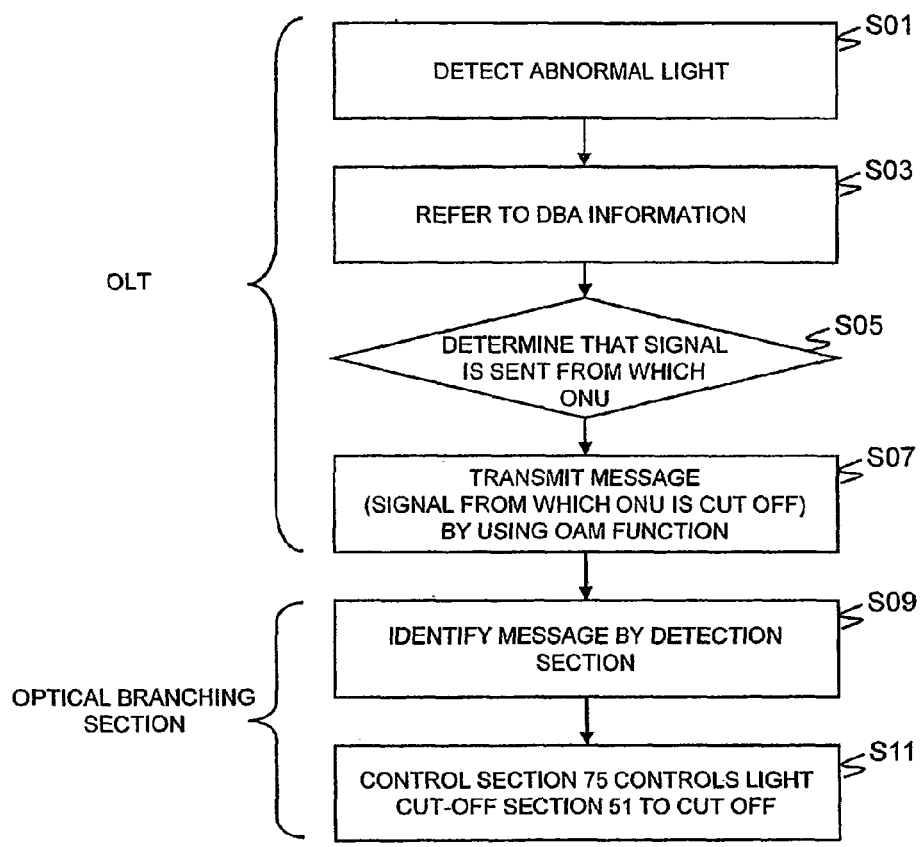
FIG. 20 is a view showing a flowchart for control in the fifth structure of the PON system according to one embodiment of the invention.

FIG. 20 is a view showing a flowchart for control in the fifth structure of the PON system.

Hereinafter, the control of the light cut-off section 51 will be described.

In the OLT transmitter/receiver 10, the optical power is branched into two by the optical coupler 72 and is outputted. The optical power branch ratio is, for example, 95:5, and most of the optical power, as the main signal, is transmitted through the optical receiver 13, the reception analog front end 12, and the reception logic module 11, and is processed as an upstream signal similarly to FIG. 1. The other signal is inputted to the light reception section 73, is converted from an optical signal into an electrical signal, and is inputted to the detection section 74. The detection section 74 detects also the output from the reception logic module 11, and when the optical power of a certain set value or higher is detected (abnormal light is detected: S01), the DBA function of the PON is used (S03), and it is determined that the signal is inputted at the timing when which ONU is assigned, that is, the signal is inputted from which ONU (S05). The control section 75 forms information indicating that a signal from which ONU is to be cut off and transmits it (S07). For example, the control section 75 forms the cut-off control information indicating that which light cut-off section 51 cuts off the optical signal and transmits it to the transmission logic module 23.

As one method of transmitting the cut-off control information, an operation administration and maintenance (OAM) function of the PON is used to transmit the information to the optical branching section 302, and a signal from the ONU specified by the control section 75 of the optical branching section 302 is cut off by the light cut-off section 51.

On the other hand, in the optical branching section 302, the optical power of the downstream signal is branched into two by the optical coupler 72 and is outputted. Here, the optical power branch ratio is, for example, 95:5, and most of the optical power, as the main signal, passes through the optical splitter 71 and the optical network apparatus side optical fiber 42, and is inputted to the ONU transmitter/receiver 100. Part of the remainder is inputted to the light reception section 73. The light reception section 73 converts an optical signal into an electrical signal, and inputs it to the detection section 74. The detection section 74 detects the cut-off control information transmitted from the OLT transmitter/receiver 10, that is, the information indicating that the signal from which ONU is cut off (S09), and the control section 75 controls the light cut-off section 51 to cut off the optical signal (S11).

Here, the light cut-off section 51 can be constructed of the optical shutter or the optical switch described before.

Thus, the optical communication system using the abnormal light cut-off system can be configured in which transmission quality is excellent, trouble rate is low, abnormal light is cut off at high sensitivity, and security is high.

As described above, according to the embodiment, the optical communication system constituting a triple play service system can be realized in which transmission quality is excellent, trouble rate is low, and security and reliability are high.

The wavelength band explained in the embodiment is merely an example, and in the invention, a suitable wavelength band can be adopted according to a suitably adopted device. Besides, the invention can be applied to various optical communication systems in addition to the PON.

What is claimed is:

1. An optical communication system in which an optical line terminating apparatus and a plurality of optical network apparatuses are connected together via an optical line terminating apparatus side optical fiber connected to the optical line terminating apparatus, a plurality of optical fibers respectively connected to the plurality of optical network apparatuses, and an optical branching section to connect the optical line terminating apparatus side optical fiber and the plurality of optical fibers, wherein the optical line terminating apparatus includes a wavelength division multiplexing section, a first optical coupler, a light receiving section, a light transmitting section, a first light reception section, a first detection section, and a first control section, the optical branching section includes one optical line terminating apparatus side port, a plurality of optical network apparatus side branch ports, a plurality of light cut-off sections, an optical splitter, a second optical coupler, a second light reception section, a second detection section, and a second control section, in the optical line terminating apparatus, the first optical coupler branches a signal from the wavelength division multiplexing section to the first light reception section and the light receiving section and outputs it, the first light reception section converts the optical signal into an electrical signal and outputs it to the first detection section, and when an abnormal signal light is inputted, the first detection section uses a dynamic bandwidth assignment function to detect that the signal from which optical network apparatus is abnormal, the first control section forms, based on the detection result, light cut-off control information indicating that the signal from which optical network apparatus is to be cut off, and outputs the light cut-off control information by the transmitting section through the wavelength division multiplexing section, the optical branching section receives the light cut-off control information through the optical line terminating apparatus side optical fiber, the second optical coupler branches the signal from the optical line terminating apparatus to the optical splitter and the second light reception section and outputs it, the second light reception section converts the optical signal into an electrical signal and outputs it to the second detection section, the second detection section detects the light cut-off control information, the second control section controls the light cut-off section corresponding to the optical network apparatus side optical fiber connected to the optical network apparatus indicated by the light cut-off control information, and the light cut-off section cuts off the optical signal sent from the optical network apparatus.

2. The optical communication system according to claim 1, wherein the abnormal signal light is a high power light of a previously set value or higher.

3. The optical communication system according to claim 1, wherein based on a timing assigned to the optical network apparatus by the optical line terminating apparatus, the first detection section of the optical line terminating apparatus determines that the input light is the signal inputted from which optical network apparatus, and detects that the signal from which optical network apparatus is abnormal.

4. The optical communication system according to claim 1, wherein the first control section uses an operation and maintenance (OAM) function to send the cut-off control information.

5. An optical line terminating apparatus in an optical communication system in which the optical line terminating apparatus and a plurality of optical network apparatuses are connected together via an optical line terminating apparatus side optical fiber connected to the optical line terminating apparatus, a plurality of optical connection sections respectively connected to the plurality of optical network apparatuses, and an optical branching section to connect the optical line terminating apparatus side optical fiber and the plurality of optical connection sections, the optical line terminating apparatus comprising a wavelength division multiplexing section, a first optical coupler, a light receiving section, a light transmitting section, a first light reception section, a first detection section, and a first control section, wherein the first optical coupler branches a signal from the wavelength division multiplexing section to the first light reception section and the light receiving section and outputs it, the first light reception section converts the optical signal into an electrical signal and outputs it to the first detection section, and when an abnormal signal light is inputted, the first detection section uses a dynamic bandwidth assignment function to detect that the signal from which optical network apparatus is abnormal, the first control section forms, based on the detection result, light cut-off control information indicating that the signal from which optical network apparatus is to be cut off, and outputs the light cut-off control information by the transmitting section through the wavelength division multiplexing section, and in the optical branching section, the optical signal from the optical network apparatus indicated by the light cut-off control information is cut off.

6. The optical line terminating apparatus according to claim 5, wherein the abnormal signal light is a high power light of a previously set value or higher.

7. The optical line terminating apparatus according to claim 5, wherein based on a timing assigned to the optical network apparatus by the optical line terminating apparatus, the first detection section determines that the input light is the signal inputted from which optical network apparatus, and detects that the signal from which optical network apparatus is abnormal.

8. The optical line terminating apparatus according to claim 5, wherein the first control section uses an operation and maintenance (OAM) function to send the cut-off control information.

9. An optical communication system in which an optical line terminating apparatus and a plurality of optical network apparatuses are connected together via a plurality of optical connection sections and an optical branching section, wherein the optical connection sections include an optical line terminating apparatus side optical fiber, a plurality of optical branching section side optical fibers, a plurality of light cut-off sections, and a plurality of optical network apparatus side optical fibers, the optical branching section includes one optical line terminating apparatus side port and a plurality of optical network apparatus side branch ports, the optical line terminating apparatus side optical fiber connects the optical line terminating apparatus and the one optical line terminating apparatus side port, the optical branching section side optical fiber connects the optical network apparatus side branch port and the light cut-off section, the optical network apparatus side optical fiber connects the light cut-off section and the optical network apparatus, and when an abnormal signal light is inputted from the network apparatus side to the light cut-off section, the light cut-off section cuts off the abnormal signal light; wherein a length of the optical branching section side optical fiber is shorter than a length of the optical network apparatus side optical fiber, wherein the light cut-off section includes an optical fuse which is cut by a high power light, and in the optical fuse, an optical power by which optical cut-off is caused is not higher than a value obtained by adding a loss of the optical line terminating apparatus side optical fiber, a loss of the optical branching section, and a loss of the optical branching section side optical fiber to a permissible optical power of the optical line terminating apparatus.

10. An optical communication system in which an optical line terminating apparatus and a plurality of optical network apparatuses are connected together via a plurality of optical connection sections and an optical branching section, wherein the optical connection sections include an optical line terminating apparatus side optical fiber, a plurality of optical branching section side optical fibers, a plurality of light cut-off sections, and a plurality of optical network apparatus side optical fibers, the optical branching section includes a plurality of light cut-off sections, an optical splitter, an optical coupler, a light reception section, a detection section, and a control section, the optical line terminating apparatus side optical fiber connects the optical line terminating apparatus and the optical coupler, the optical branching section side optical fiber connects the optical splitter and the light cut-off section, the optical network apparatus side optical fiber connects the light cut-off section and the optical network apparatus, the optical coupler branches signals from the plurality of optical network apparatuses to the optical line terminating apparatus side optical fiber and the light reception section and outputs them, and the light reception section converts an optical signal into an electrical signal and outputs it to the detection section, and when an abnormal signal light is inputted from the network apparatus side to the light reception section, based on information detected by the detection section, the control section controls to cut off the optical signal by one of or all of the light cut-off sections, wherein in the control section, when an optical cut-off optical power is not higher than a value obtained by adding a loss of the optical line terminating apparatus side optical fiber, a loss of the optical branching section, and a loss of the optical branching section side optical fiber to a permissible optical power of the optical line terminating apparatus, the light cut-off section cuts off the optical signal.

11. An optical communication system in which an optical line terminating apparatus and a plurality of optical network apparatuses are connected together via a plurality of optical connection sections and an optical branching section, wherein the optical connection sections include an optical line terminating apparatus side optical fiber, a plurality of optical branching section side optical fibers, a plurality of light cut-off sections, and a plurality of optical network apparatus side optical fibers, the optical branching section includes a plurality of light cut-off sections, an optical splitter, an optical coupler, a light reception section, a detection section, and a control section, the optical line terminating apparatus side optical fiber connects the optical line terminating apparatus and the optical coupler, the optical branching section side optical fiber connects the optical splitter and the light cut-off section, the optical network apparatus side optical fiber connects the light cut-off section and the optical network apparatus, the optical coupler branches signals from the plurality of optical network apparatuses to the optical line terminating apparatus side optical fiber and the light reception section and outputs them, and the light reception section converts an optical signal into an electrical signal and outputs it to the detection section, and when an abnormal signal light is inputted from the network apparatus side to the light reception section, based on information detected by the detection section, the control section controls to cut off the optical signal by one of or all of the light cut-off sections, wherein the detection section has a function to analyze monitor control information of a PON frame of an optical signal, and when an unauthorized signal is detected, the control section controls the relevant light cut-off section to cut off the optical signal.

* * * * *